United States Patent [19]

Woodward

[11] Patent Number: 4,860,413
[45] Date of Patent: Aug. 29, 1989

[54] METHOD OF AND APPARATUS FOR USE IN FORMING DIAMETRICALLY OPPOSED STUDS ON TUBULAR CONNECTORS

[76] Inventor: Richard Woodward, Box 147, Harrison, Me. 04040

[21] Appl. No.: 123,959

[22] Filed: Nov. 23, 1987

Related U.S. Application Data

[63] Continuation of Ser. No. 886,049, Jul. 16, 1986, abandoned.

[51] Int. Cl.$^4$ .......................... B23C 1/14; B23P 13/02; B23Q 7/02
[52] U.S. Cl. ...................................... 29/38 C; 29/563; 29/558; 409/132; 409/198
[58] Field of Search .................. 29/38 A, 38 C, 33 R, 29/33 J, 563, 564, 557, 558, 161; 409/190, 191, 192, 203, 204, 132, 198; 408/42, 43, 44, 34, 37, 40, 53, 118, 130

[56] References Cited

U.S. PATENT DOCUMENTS

| | | | |
|---|---|---|---|
| 1,951,093 | 3/1934 | Johnston | 408/41 |
| 3,170,375 | 2/1965 | Weidauer | 409/198 |
| 3,439,413 | 4/1969 | Stillwagow | 29/558 |
| 3,550,255 | 12/1970 | Sierski | 29/557 |
| 4,151,783 | 5/1979 | Zimmerman | 409/190 X |
| 4,163,313 | 8/1979 | Matsuno et al. | 408/44 X |
| 4,163,622 | 8/1979 | Akaba et al. | 408/41 X |
| 4,301,581 | 11/1981 | Bader et al. | 29/564 X |
| 4,520,595 | 6/1985 | Diener | 29/563 X |

*Primary Examiner*—Z. R. Bilinsky

[57] ABSTRACT

Diametrically opposed studs are formed from a flange on the unfinished portion of a tubular threaded connector by first milling the flange to leave diametrically disposed portions of a cross sectional area such that a stud may be formed from each such portion. Apparatus for use in thus forming the studs enables each connector to be held with its unfinished portion exposed by means of a selected one of the four collets mounted on a turntable and spaced 90° apart. The turntable is indexed from a loading and unloading station to a second station where the major part of the flange at one side of a connector is removed when a collet reaches that station. When the turntable is again indexed, the connector held by that collet is held at a third station where a like portion of the flange is removed from the opposite side to establish the wanted, diametrically opposed portions. When the turntable is again indexed, that connector is brought to a fourth station where the studs are formed from the remaining flange portions. On the next indexing of the table, the finished connector is brought to the loading and unloading station where it is removed and replaced while other connectors are being advanced from one station to the next. While the operator starts each index, a computer controls the operations at the second, third and fourth stations.

6 Claims, 6 Drawing Sheets

METHOD OF AND APPARATUS FOR USE IN FORMING DIAMETRICALLY OPPOSED STUDS ON TUBULAR CONNECTORS

This is a continuation of application Ser. No. 886,049, filed July 16, 1986, now abandoned.

BACKGROUND OF THE INVENTION

A widely used type of tubular connector has a threaded portion for attachment to one end of one conduit and transversely aligned studs to enable one end of another conduit to be detachably connected to the connector by a bayonet type of joint.

Connectors for such a use, as formed by screw machines, have threaded portions so that they can be attached to the threaded end of a conduit. The other end portions of such connectors are flanged and the necessary studs are always provided by removing the flanges, boring transversely aligned holes and inserting studs therein, a procedure that adds to the cost of the connectors and to production times. As far as I am aware, all connectors of this type made prior to the present invention were made in this manner.

THE PRESENT INVENTION

The general objective of the present invention is to enable tubular connectors which have been threaded for attachment to one conduit but have an unfinished flanged portion to be finished by providing them with transversely aligned studs on a basis which ensures substantial economies to be realized due to the formation of the studs from flange material.

In accordance with the invention this objective is attained by holding each such unfinished connector with its unfinished end exposed, removing from one side of the connector a major portion of the flange exposed at that side, removing from the opposite side of the connector a like portion of the exposed flange, preferably the removal of the flange material effected in seaprate operations, with such removed portion having an arcuate extent of less than but close to 180°. The remaining portions of the flange are diametrically opposed and the cross sectional area of each is such that a stud of wanted dimensions can be and then is formed therefrom to finish that connector.

Apparatus in accordance with the invention has a turntable supported by a base and adapted to carry the connectors from a loading and unloading station successively through second, third and fourth stations where operations are performed on the connectors during dwells (and then to the loading and unloading station there to be removed and replaced).

At the second station, one part of the flange is removed, at the third station and oppositelike flange part is removed leaving diametrically disposed flange portion and at the fourth station, studs are formed from such remaining flange portions to finish the connector for removal at the end of the next step.

Another objective of the invention is to provide for the proper support of the connectors as they are advanced through the several stations. For this purpose, equally spaced units are mounted on the turntable. Each unit has a collet the resilient fingers of which are normally so positioned as to enable connectors to be placed on or removed therefrom and an air operated device operable to reciprocate a piston between retracted and advanced positions in the latter of which the fingers are so expanded as to securely anchor a connector thereto. Operating air is delivered by a separate conduit to the cylinder of each unit from a vertical axial conduit mounted on the turntable which has a rotatable connection with a fixed supply conduit from a suitable source. Each conduit to a cyclinder has a valve adapted to be so operated automatically when a unit is at the loading and unloading station that the collet fingers are released from their connector gripping relationship.

Another objective of the invention is that at providing for the proper support, positioning and operation of the tools operating on flange portions at the second, third and fourth stations. For this purpose, air operated piston cylinder devices are employed which are mounted on the base. One component of each such device is fixed and the other component is reciprocated between retracted and advanced positions relative to the path of the units which carry the connectors. The reciprocable components may carry an air motor and a tool rotated thereby and in said advanced position, the tool is brought into working contact with a flange of a connector when its supporting unit is stopped during a station dwell. The reciprocable unit may carry a similar device the reciprocable component of which carries an air motor and an attached tool but with the path of the reciprocation of the tool of the similar device at right angles to that of the reciprocable component of the base supported device.

A like base supported device is located at the fourth station but differs in that its reciprocable component has a fork each branch of which supports similar devices having their air motors and attached tools transversely aligned with the tools so spaced in their retracted positions that when the reciprocable component of the base supported device has been advanced, the two remaining portions of the flange are in alignment with the axes of the tools. When the reciprocable components of the fork supported devices are advanced into their operating positions, the studs are formed thereby.

All such devices have limit switches which determine the extent of travel of the reciprocable components thereof and the devices as well as the air motors are operated by air under pressure. The associated air and electrical circuitry are under the control of a computer ensuring that the wanted operations are quickly and accurately performed.

Other objectives of the invention and the manner of their attainment will be apparent from the following specification and the appended claims.

BRIEF DESCRIPTION OF THE DRAWINGS

The accompanying drawings illustrate a preferred embodiment of the invention

THE PREFERRED EMBODIMENT OF THE INVENTION

Before discussing the apparatus by which tubular connectors are provided with transversely aligned studs to enable the connectors to be used where bayonet joints are required, reference is first made to FIGS. 7–10.

Figure 7:
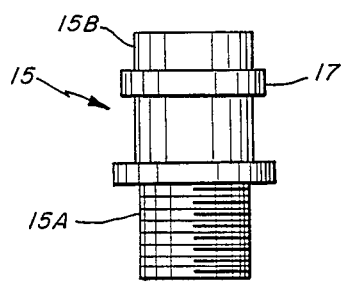
FIG. 7 is a side view of one type of connector.
Figure 8:
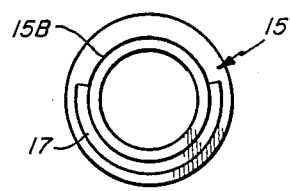
FIG. 8 is an end view of the connector with a first part of the flange removed.
Figure 9:
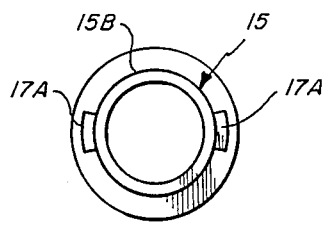
FIG. 9 is a view similar to FIG. 8 but with the second part of the flange removed.
Figure 10:
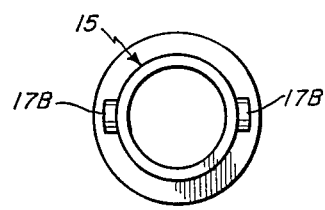
FIG. 10 is yet another similar view but with the studs formed from the remaining portions of the flange. formed from the remaining portions of the flange.

The connector 15 is but one of several types with which the invention is concerned and, as shown in FIG. 7, it is as it is formed by conventional screw machinery. All types of such connectors, as thus produced, have a threaded portion 15a and an unfinished portion 15b having a flange 16. In FIG. 8, a first flange portion, the arcuate extent of which is close to but less than 180° in extent, has been removed and, as shown in FIG. 9, when a similar, opposite flange portion has been removed from the opposite side of the connector, there remains the two diametrically opposite flange portions 17a which remains are so dimensioned that studs 17b can be formed therefrom, see FIG. 10, to complete the connector.

Figure 1:
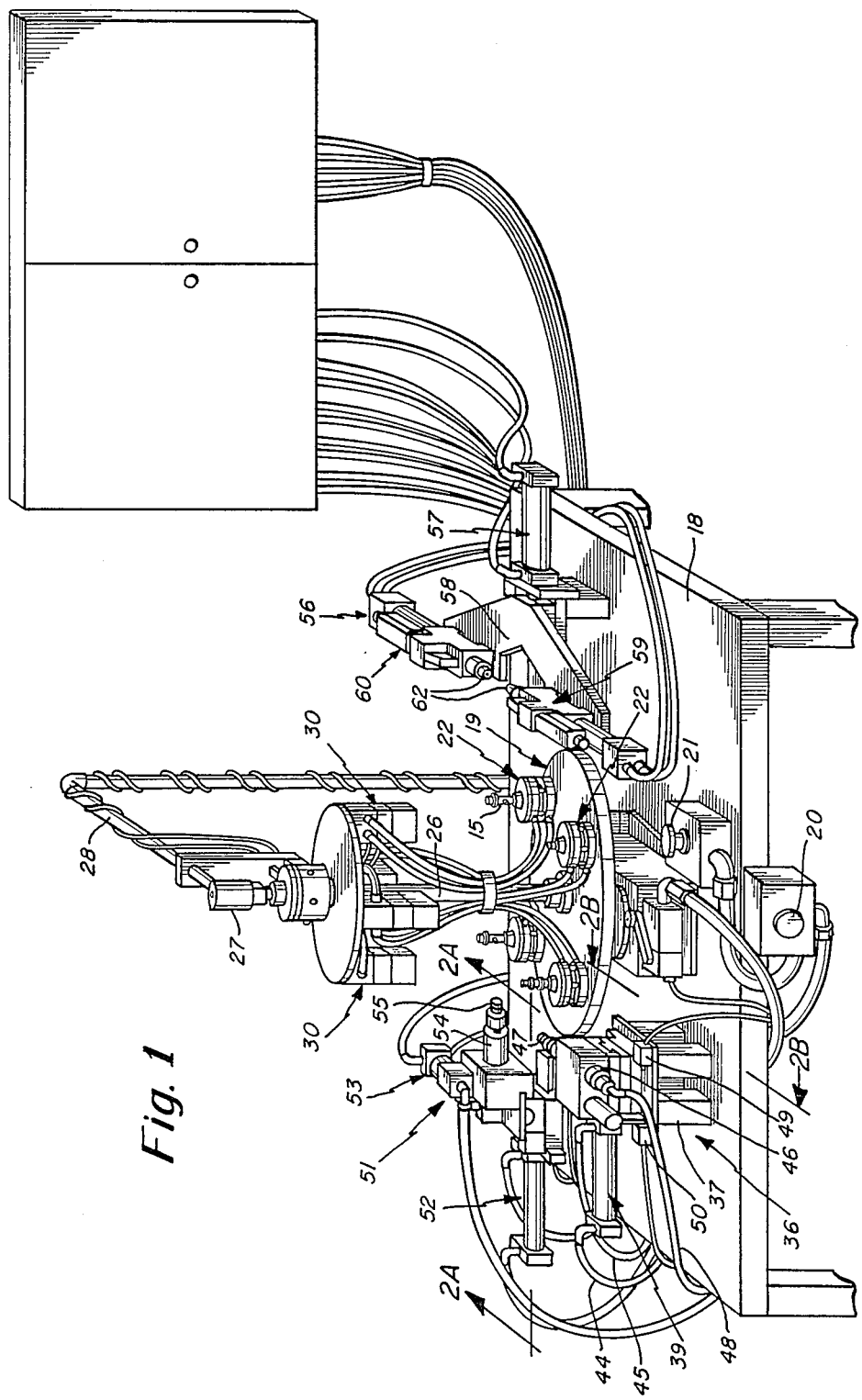
FIG. 1 is a perspective view of the apparatus.

The apparatus for use completing such connectors is shown in FIG. 1 as having a base 18 on which a turntable 19 is rotatably mounted. The turntable 19 is of a type made by Jackson Machine Products, Madison Heights, Mich., and is provided with a drive, not shown, under the control of the operator's starting switch 20 and an emergency stop switch 21, the drive is operable to turn the turntable 19 through a step of 90° each time the switch 20 is closed.

Figure 3:
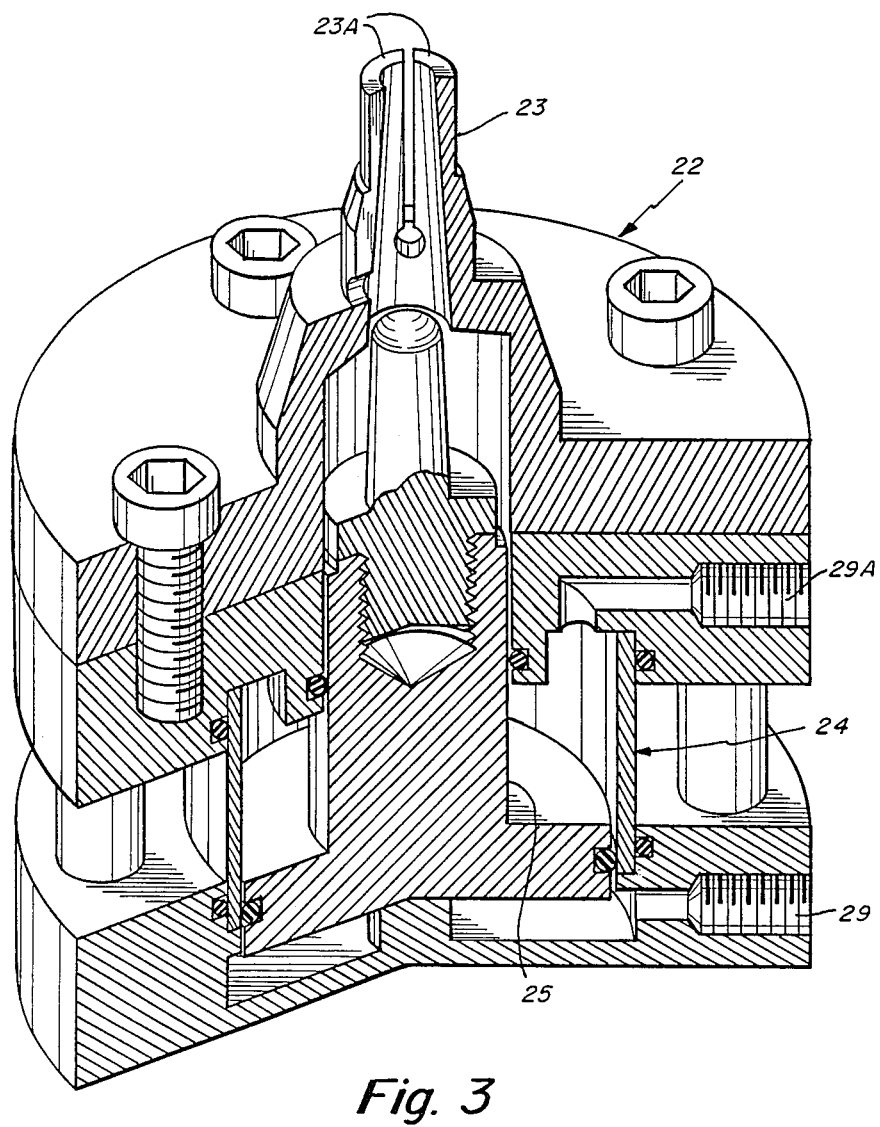
FIG. 3 is a section taken vertically through one of the connector holding units.
Figure 4:
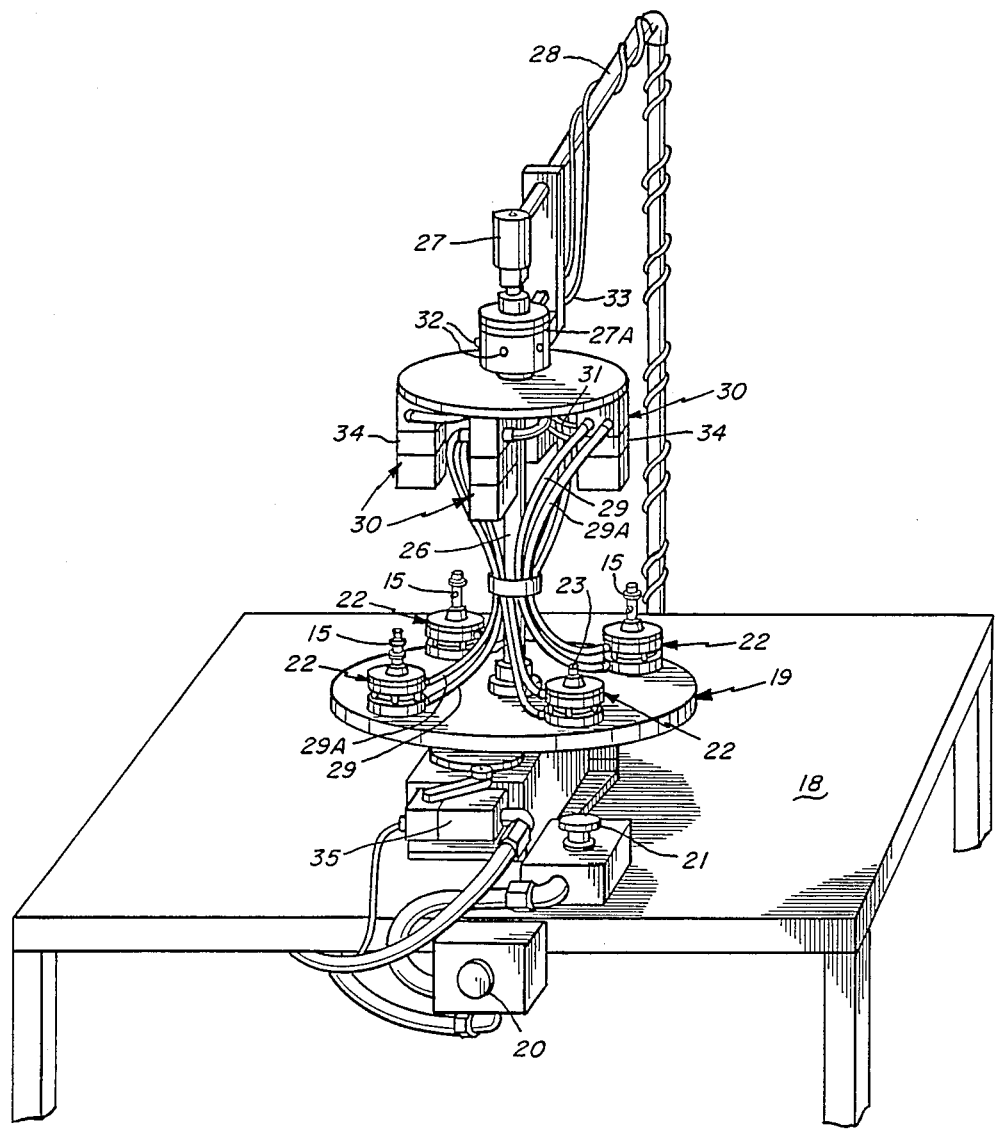
FIG. 4 is a plane view of the turntable and the base.
Figure 5:
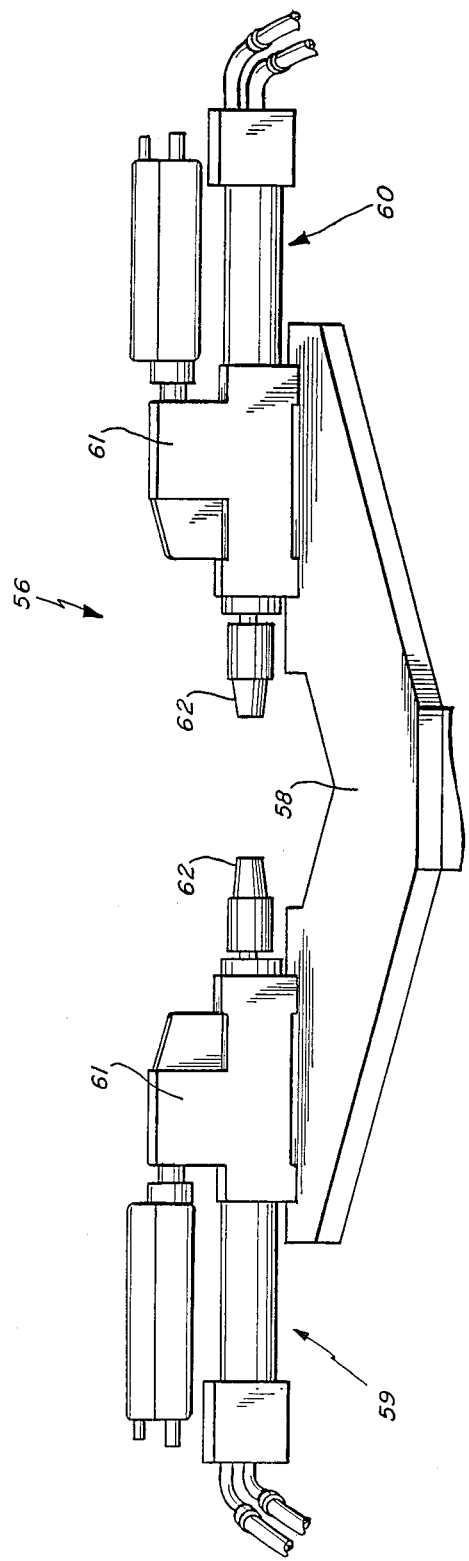
FIG. 5 is a view showing the mounting of the milling units at the fourth station.

The turntable 19 is provided with four units, generally indicated at 22 and detailed in FIG. 3. Each unit has a collet 23 and an air cylinder 24 having a piston 25 operable to expand the resilient collet fingers 23A from a first relationship in which a connector 15 may be placed thereon with its unfinished portion 15B upwardly disposed into a second relationship in which the fingers 23A securely grip the thus positioned connector.

The turntable 19 is provided with an axially located column 26 having a rotatable joint, generally indicated at 27, with a supporting arm 28, which is a conduit from a suitable source of air under pressure. Air from the column 26 is placed in communication with the cylinders 24 by branch conduits 29 each of which is provided with a normally open, solenoid operated valve 30 in a lead 31. The leads 31 have contacts 32 in engagement with a ring 27A which is a fixed part of the rotary joint and the supply lead 33 supported by the arm 28 is connected thereto. It will be noted that there is a second conduit 29A from each valve 30 which is in communication with the associated cylinder 24 when the valves 30 are closed in a manner such that air delivered thereby will force the piston 25 of that cylinder into its retracted position ensuring that the resilient collet fingers 23A are freed to return to their connector releasing relationship. Each lead 31 has a normally open switch 34 located adjacent the periphery of the turntable 19, the contacts 27A and the arm 34B.

The base 18, see FIG. 3, has four stations spaced 90° apart. The first station is located adjacent the start switch 20 and is the loading and unloading station. Each switch contact 34 is engaged at the first station on its engagement with a switch operator 35 located at the first station thus to effect the setting of the appropriate valve 30 to enable a connector 15 to be removed from or to be placed on the collet of the unit 22 then at the first station.

The second station is where the first operating unit, generally indicated at 36, is located. The function of the unit 36 is to remove a substantial portion of the flange 16 exposed at one side of the connector 15 when held at that station during a dwell period. The arcuate extent of the removed flange portion is close to but less than 180°. For this purpose, the operating unit 36 has a mount 37 fixed on the base 18 in support of the piston 38 of a piston-cylinder device, generally indicated at 39, and manufactured by the Aro Corporation, Bryan, Ohio. The fixed piston 38 has air passages 40 and 41 opening into the cylinder 42 on opposite sides of the piston head 43. Hose lines 44 and 45 are connected to air passages 40 and 41 respectively. Mounted on the cylinder 42 is an air motor 46 disposed with its axis normal to that of its supporting cylinder and is so positioned that the tool 47 fixed on the motor shaft is in the plane of the flange 16 of any connector when advanced to the second station. Air to the motor 46 is delivered thereto by a hose line 48. The delivery of air to the motor 46 and to the cylinder 42 will be later described.

When air is delivered into the cylinder 42 via the passage 40, the tool 47 is advanced into working contact with the proximate side of the flange 16 with the extent of its advance controlled by the limit switch 49. The tool 47 is retracted when air is delivered into the cylinder 42 via the passage 41. The retracted position of the tool 47 is established by the limit switch 50.

After a connector 15 has been operated on at the second station and after the turntable 19 has again been indexed, it is located at the third station where the second operating unit generally indicated at 51 is located. The function of the operating unit 51 is to effect the removal of a like portion of the flange 16 from the opposite side of the connector to provide diametrically opposed and substantially identical remaining flange portions 16B.

To that end, the unit 51 includes a piston-cylinder device 52 generally similar to the piston-cylinder device 39 and is accordingly not detailed but corresponding parts are designated by the same reference numerals which are distinguished by the suffix addition "A". The cylinder 42A supports another similar piston-cylinder device 53 which has its corresponding parts identified by the same reference numerals which are distinguished by the suffix addition "B". The axis of the cylinder 42B is at right angles relative to that of the cylinder 42A and its supports an air motor 54 with its axis and that of its tool 55 in vertical alignment with the axis of the cylinder 42B. The tools 47 and 55 are identical. The disposition of the devices 52 and 53 is such that the device 53 is operable to reciprocate the tool 55 across the turntable 19 in the plane of the flange 16 of a connector present at the third station but with its path spaced therefrom. The device 52 is operable to reciprocate the device 53 and accordingly the tool 55 into and out of working contact with the appropriate opposite portion of the flange 16.

After the operation on a connector 15 at the third station has been completed, the next indexing of the turntable 19 brings that connector to the fourth station where the flangeportions 16B are converted into studs 17. To that end, an operating unit 56 is mounted on the base 18 and, as it has a piston-cylinder device 57 generally similar to the devices 36, 52 and 53, it is not detailed and the reference numerals of corresponding parts are distinguished by the suffix addition "C". The cylinder 42C differs from the other corresponding cylinders in that it is provided with a fork 58 each arm of which supports piston-cylinder devices generally indicated at 59 and 60 which are similar to those at the second and third stations and have their reference numerals distinguished by the suffix additions "D". A difference is that the air motors 61 of the divices 59 and 60 are disposed with their axes in alignment and their tools 62 so spaced apart that when the tools are in their inoperative positions and the device 57 operated to advance the fork 58 over the turntable 19, the connector 15 is between the tools and its portions 16B are in alignment with the axes thereof. When the devices 59 and 60 are operated to advance the tools into their working positions, they engage said flange portions and complete the connector by forming the wanted studs 17 therefrom.

On the next indexing of the turntable 19, the finished connector is returned to the loading and unloading station and is released for removal and replacement and any connector at any other station is advanced to the next station.

Figure 2A:
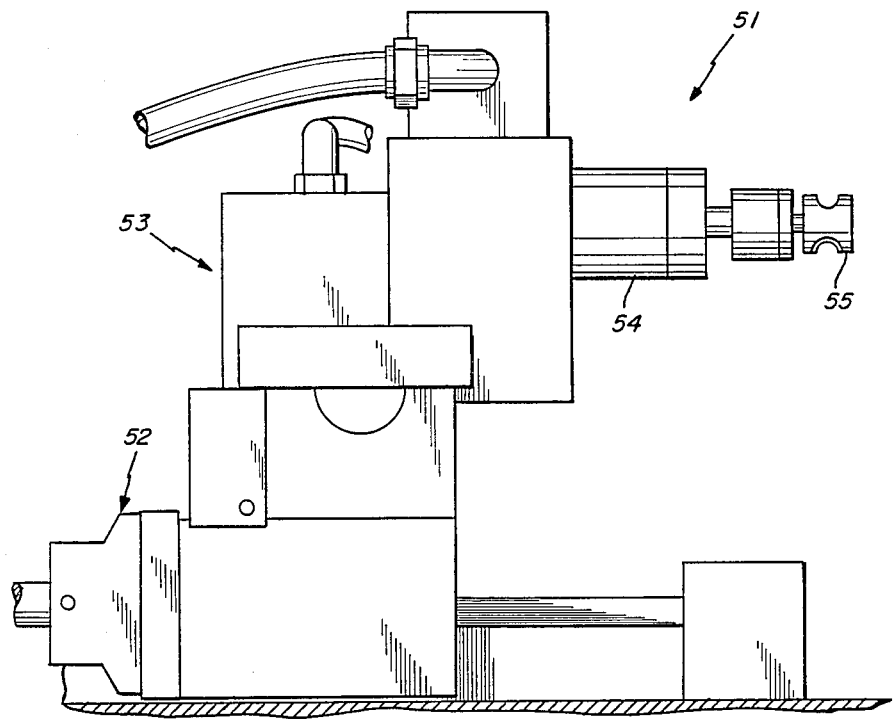
FIG. 2A is a somewhat schematic view of the air and electricity supply systems.
Figure 2B:
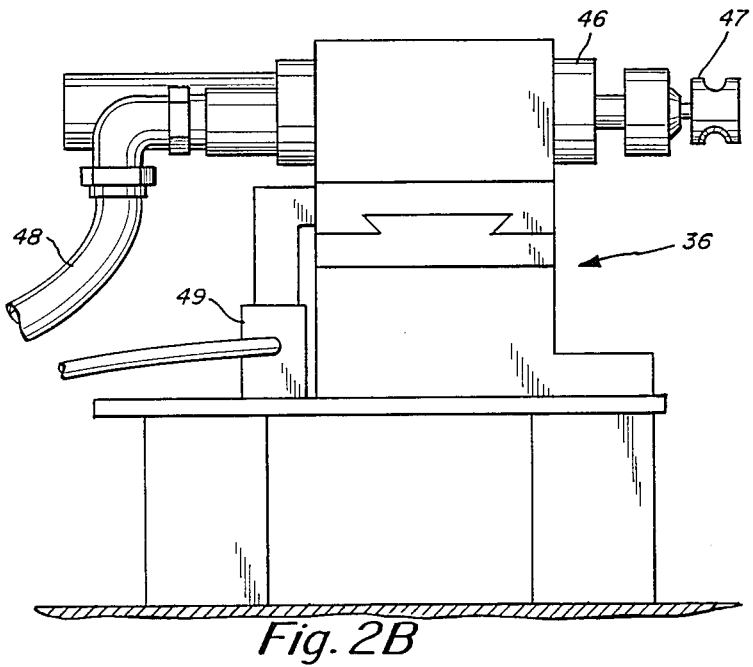
FIG. 2B is a view of one of the units.

The several devices 39, 52, 53, 56, 59 and 60 have similarly functioning limit switches and hose lines and references made to FIG. 2 where six air cylinders 63, 64, 65, 66, 67 and 68 are shown and these have identical solenoid control valves 69, 70, 71, 72, 73 and 74 respectively.

Figure 6:
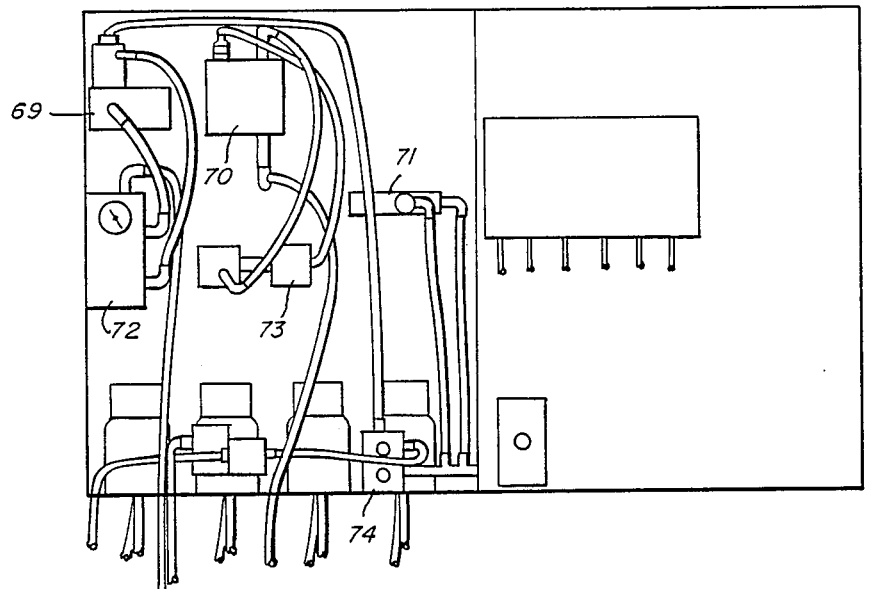
FIG. 6 is a schematic presentation of the computer functions.

The computer functions, as set forth in FIG. 6 are those ensuring the proper sequence of the operations at the second, third and fourth stations in response to inputs from the limit switches.

I claim:

1. The method of completing a tubular connector of a type having a threaded portion and an unfinished portion having a flange by providing the unfinished portion with transversely aligned studs, said method consisting of the steps of holding a connector with its unfinished portion exposed, removing major portions of the flange from opposite sides of the connector in a manner leaving two oppositely disposed portions so dimensioned that a stud can be formed from each such portion, then forming said studs from said portions and finally releasing the finished connector.

2. The methhod of claim 1 in which the flange removal step consists in first the removal of one major flange portion from one side of the held connector and then the removal of a like flange portion from the opposite side of the held connector.

3. The method of claim 1 in which both studs are simultaneously formed.

4. Apparatus for completing a connector having a threaded portion and an unfinished portion having a flange by forming therefrom two diametrically disposed studs, said apparatus including a base, a turntable rotatably supported by the base, at least four units mounted on said turntable equally spaced with reference to the axis thereof and to each other, each unit including a collet of a type having expandable fingers and an air cylinder having a piston movable into and out of position within said collet expanding said fingers from a normal relationship in which a connector may be seated on or removed therefrom into a relationship gripping said connector, said base provided with a station for each unit, the first station a loading and unloading station, the second, third and fourth stations operation stations, means operable to so index the turntable that each unit is successively stopped at the stations in the order named, means at the second station, operable when a unit stops there, to so mill the flange from one side of the connector as to remove said flange through an arc of less than but close to 180° in extent, means at the third station, operable when a unit stops there, to mill said flange from the opposite side of the connector to the similar extent thereby leaving two diametrically opposed flange portions, means at the fourth station, operable when a unit stops there, to form said studs from said flange portions, means to deliver air to each cylinder, means operable when a unit stops at the loading and unloading station to effect the first position of the fingers of the collet then to permit the removal and replacement of a connector, each of the milling means includes at least one piston-cylinder device having one component connected to the base and the other component reciprocable between retracted and advanced positions, and including a fork, an air motor connected to each arm of the fork, and a tool attached to and rotated by each motor and adapted to perform a wanted operation on a portion of the flange of the connector, the reciprocable component at the fourth station including a fork to each arm of which a tool equipped motor is attached, said tools having a common axis and disposed to receive a connector between them when the fork is in its advanced position, and valve controlled means operable during a dwell to effect the reciprocation of the tool into and out of working engagement with said flange portion and the operation of said motor.

5. The apparatus of claim 4 in which the opposite flange portions are those remaining when a connector reaches the fourth station.

6. The apparatus of claim 4 in which each of the operating means includes at least one piston-cylinder device having one component connected to the base and the other component reciprocable between retracted and advanced positions and including a fork, an air motor is connected to each arm of the fork, a tool attached to and rotated by each motor and adapted to perform a wanted operation on a portion of the flange of the connector, said tools having a common axis and disposed to receive a connector between them when the fork is in an advanced position, valve controlled means operable during a dwell to effect the reciprocation of the tool and into and out of working engagement with said flange portion and the operation of said motor.

* * * * *